C. N. HATFIELD.
GRAIN AND SEED CLEANER.
APPLICATION FILED APR. 29, 1918.
1,323,691.
Patented Dec. 2, 1919.
3 SHEETS—SHEET 3.
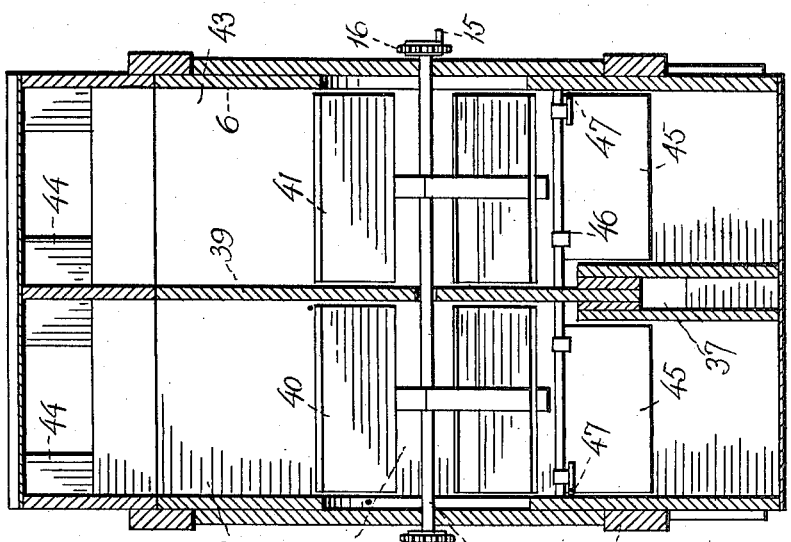
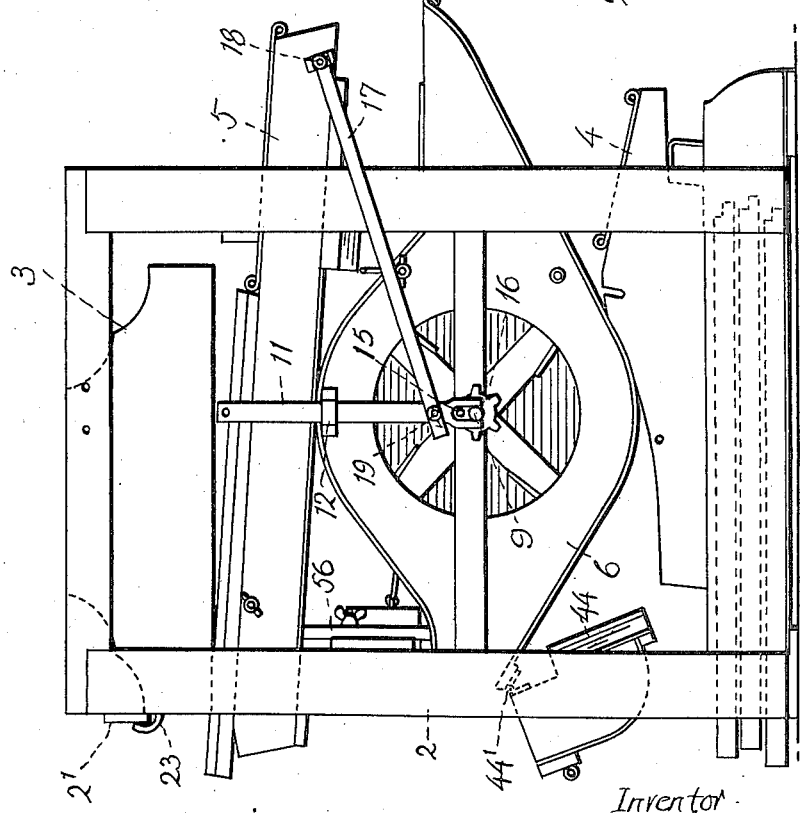

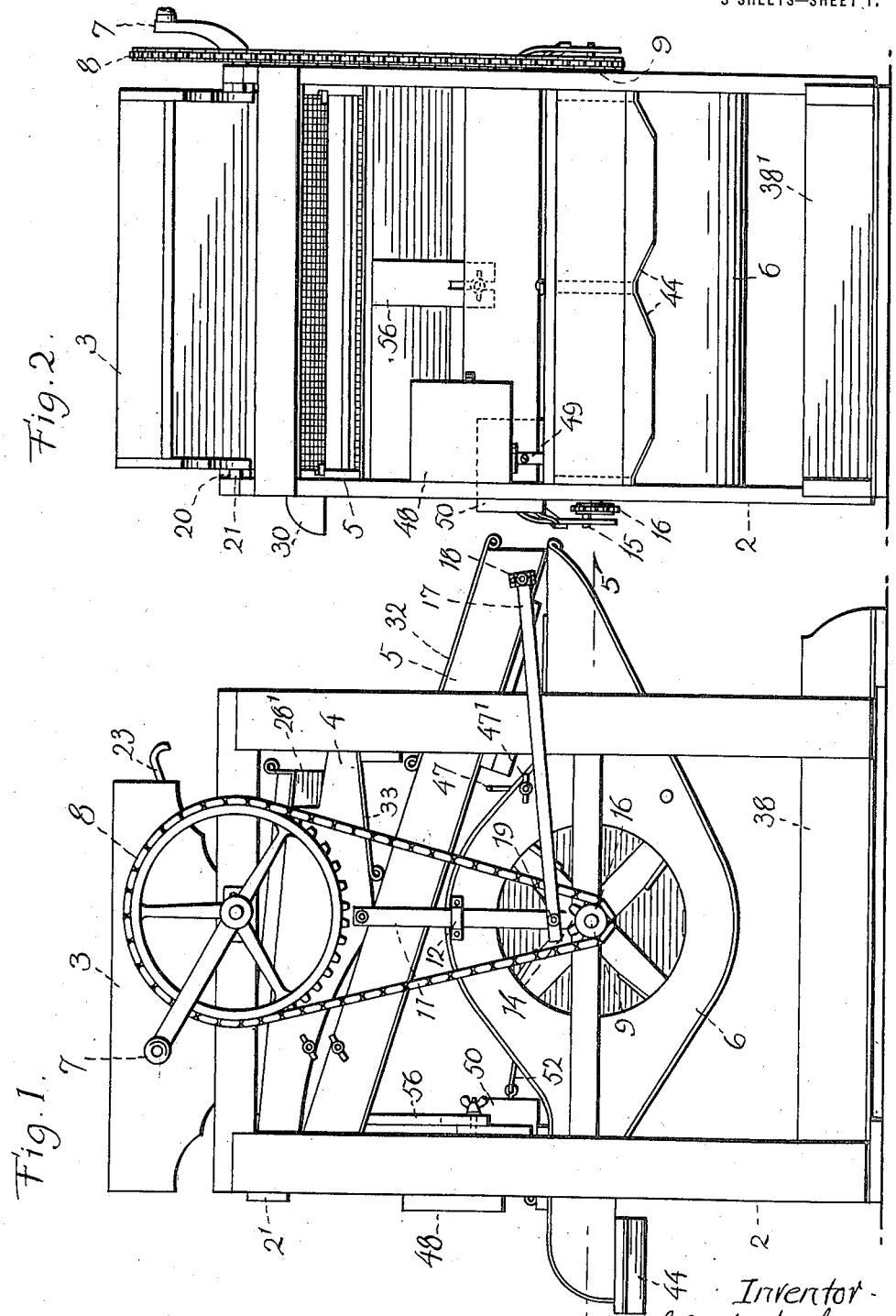
C. N. HATFIELD.
GRAIN AND SEED CLEANER.
APPLICATION FILED APR. 29, 1918.
1,323,691.
Patented Dec. 2, 1919.
3 SHEETS—SHEET 1.
Inventor
Charles N. Hatfield.
by E. W. Anderson
Attorneys.

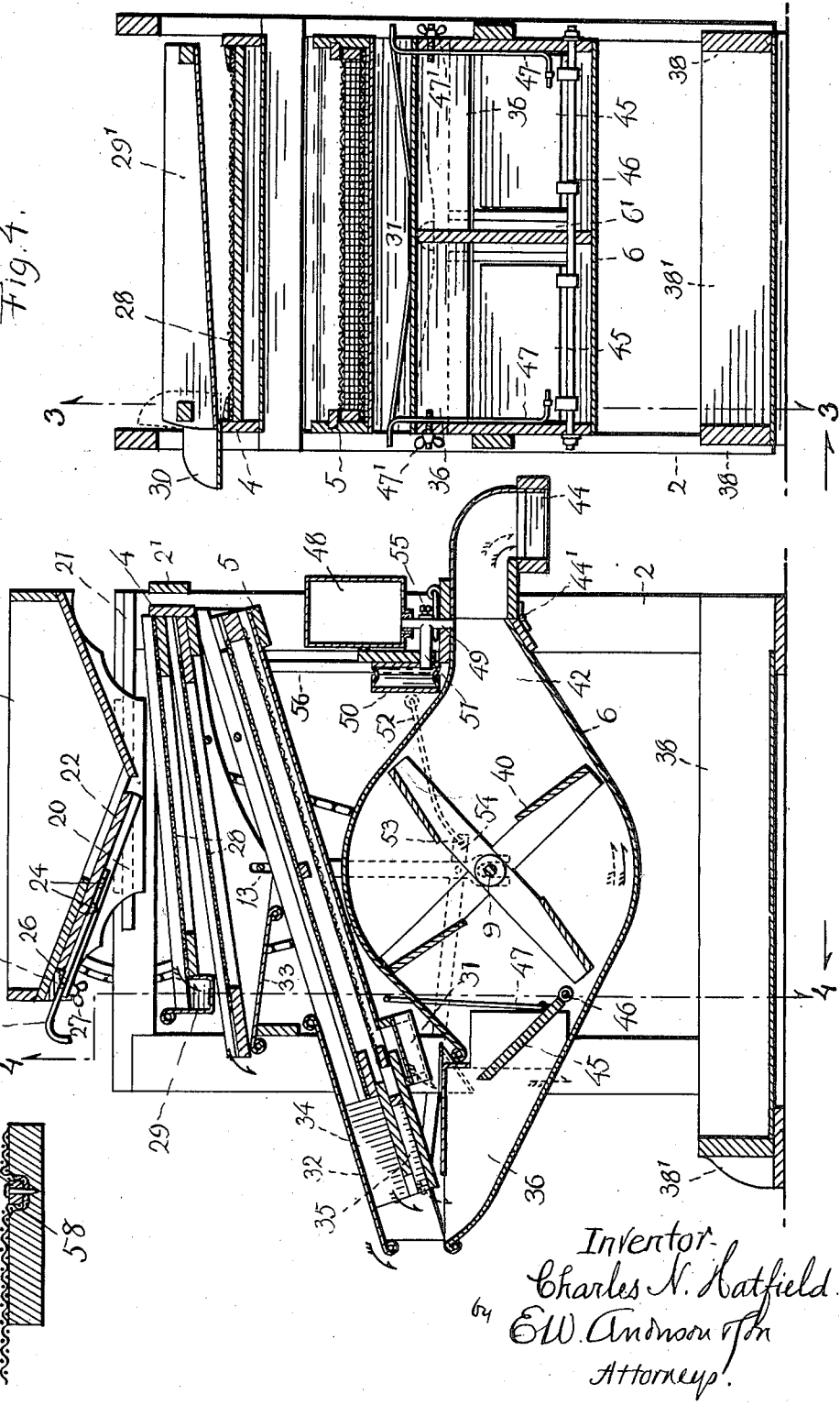

UNITED STATES PATENT OFFICE.

CHARLES N. HATFIELD, OF FOUNTAIN CITY, INDIANA.

GRAIN AND SEED CLEANER.

1,323,691. Specification of Letters Patent. Patented Dec. 2, 1919.

Application filed April 29, 1918. Serial No. 231,474.

*To all whom it may concern:*

Be it known that I, CHARLES N. HATFIELD, a citizen of the United States, resident of Fountain City, in the county of Wayne and State of Indiana, have made a certain new and useful Invention in Grain and Seed Cleaners; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to grain and seed cleaners, and it consists in the novel construction and combinations of parts, as hereinafter set forth.

In the accompanying drawings, illustrating the invention, Figure 1 is a side view of the cleaner; Fig. 2 is an end view of the same; Fig. 3 is a section on the line 3—3, Fig. 4; Fig. 4 is a section on the line 4—4, Fig. 3; Fig. 5 is a section on the line 5—5, Fig. 1; Fig. 6 is a side view of the cleaner as assembled for crating; Fig. 7 is a detail fragmentary sectional view showing the manner of securing the screen wire cloth to the screen frame.

The numeral 2 designates the supporting framework, wherein are mounted an upper hopper 3, upper and lower vibratory shoes 4 and 5, and a fan casing 6, below the lower shoe, an operating handle 7 having sprocket gear connection 8 with the fan shaft 9. The shoes are vibrated by means of upright lever 11, pivoted intermediately of its length at 12 to the fan casing and having at its upper end pivotal connection 13 with the upper shoe and at its lower end pivotal connection 14 with a wrist pin 15 of the small sprocket 16 upon the fan shaft, an inclined operating rod 17 having at its outer end a pivotal connection 18 with one end of the lower shoe and at its opposite end a pivotal connection 19 near the lower end of the lower arm of the lever 11. In this way, when the fan shaft is rotated by operation of the crank handle, the shoes will be vibrated or moved back and forth simultaneously in opposite directions. The upper shoe has open-end slots at its sides, engaging operating rod 13, connecting the levers 11, there being two such levers, as also two rods 17, one at each side.

The hopper is provided at each side with a horizontal groove or guideway 20, engaging a horizontal rib 21 of the framing, whereby the hopper may be slid horizontally to discharge upon the upper screen of the upper shoe at various locations, either at the upper end of the said screen or the middle of the screen, and points therebetween.

The valve board 22 of the hopper is provided with an operating rod 23, which is secured at its lower end to the middle of said board by two screws or bolts 24, said rod at its upper portion sliding in a guideway formed by two bolts 25 of the hopper frame and a cross-bar 26, a thumb nut 27 upon one of said bolts serving to clamp the rod against movement and secure the valve board in position as adjusted. The operating rod being rigidly secured at its lower end to the middle of the valve board, and working in guides as stated, will serve to adjust said board evenly at both sides by a straight pull, for an even flow of seed or grain. The thumb nut may be made just tight enough to exert a frictional bind upon the rod, to hold it in position as adjusted, or it may be made very tight, to prevent any movement, or it may be loose, for chaffing or cleaning of coarse grain. The hopper is reversible, end for end, and may be slid in engagement with its guides from either end of the machine, to enable the valve board to be operated from either end of the machine.

The upper shoe is adapted to carry one, two or three screens 28, the uppermost screen, when two or three screens are used, discharging the purified material at its lower end into a laterally extending inclined chute 29, said chute attached to the screen and delivering at one side of the machine, a hinged spout 30, carried by the shoe, being used at the discharge end of this chute to carry the screenings clear of the machine, said spout capable of being turned up, out of the way, as shown in dotted lines, Fig. 4.

The purified seed or grain will be discharged from a single screen, or from the lower screen or screens of two or three screens, of the upper screen shoe upon a plate or board 32, forming the top of the lower end of the lower shoe, and therefrom into a suitable receptacle. The material passing through a single screen, or through the lower of two or three screens, of the upper shoe will be discharged upon an oppositely inclined board or plate 33, carried at the bottom of the lower end of the upper shoe and discharging near the middle of the top screen of the lower shoe, fully one-half or more of the upper shoe being open at the bottom, so that material passing through the screens of this shoe will fall gradually upon the upper half of the uppermost screen of the lower shoe, rather than all at once upon the upper part of said uppermost screen.

The lower shoe is adapted to carry two superposed screens, the purified material from the upper screen passing laterally, through the medium of a grade strip 34 at bottom, to one side of the machine, and the purified material from the lower screen passing laterally, through the medium of a grade strip 35 at the lower part thereof, to the opposite side of the machine. The material so delivered to both sides of the machine is discharged into entrance passages 36 inclined downwardly to the fan casing, said casing divided into two sections, located side by side, through partition board 39. Two fans, 40 and 41 are located side by side upon the fan shaft and work in the two sections of the casing, to cause the material to pass through said sections and outlet passages 42 and 43, inclined upwardly from the fan casing. Each outlet passage is provided with a spout 44, extending downwardly at its outer end, to discharge into a measure when so desired, said down-spouts hinged at their upper ends at 44', whereby they may be turned downwardly between the sides of the framing, as shown in Fig. 6, in which case the material may be thrown quite a distance clear of the machine, by the operation of the fans, which is of obvious advantage. A valve board 45 is located in the inlet passage of each section of the fan casing, being pivoted at its lower end at 46, and is provided with an adjusting rod 47, having a clamp nut 47' to secure the adjustment.

The impurities passing through both screens of the lower shoe are discharged at the lower end of the shoe, upon a trough 31 thereof, said trough discharging centrally of the shoe, through spout 37 formed in the fan casing, and thence to the inclosed floor of the machine, said floor having sides 38 and end 38', to provide a receptacle.

A disinfectant receptacle 48 discharges into the outlet passage of one of the casing sections, through vertical tube 49, a bellows 50 having a horizontal blast tube 51 communicating with said vertical tube intermediately of the length of the latter, whereby the bellows blast is divided, part passing upwardly into the disinfectant receptacle, to agitate the contents thereof, and part passing downwardly, to facilitate or force the discharge of the disinfectant. An operating rod 52 for the bellows is provided with a pivotal connection 53 with an extension arm 54 of the shoe-vibrating rod. It is preferred that the horizontal tube from the bellows be of larger diameter than the vertical tube, to provide a stronger blast. In the use of disinfectant solution the bellows blast will compress the air in the receptacle above the solution, to increase the feed, and in the use of both powdered and dissolved disinfectant, the air blast from the fan serves to scatter the powder or the solution to the grain and seed being cleaned. The disinfectant feed is controlled by valve 55.

The lower shoe slides at its upper end upon a block 56, adjustable vertically to vary the inclination of said shoe, the latter resting and sliding at its lower end upon the sides of the fan casing, or rather of the inlet passages leading to said casing. The shoe, having a bearing at each end upon which it rests and slides, may be given an even and smooth vibratory movement, to drift off sticks, joints and white caps.

In order to give the shoe a rocking movement, upwardly and downwardly, as well as a lengthwise vibratory movement, in cleaning cotton seed and seed corn or to keep the screens from clogging, the block or bearing 56 is dropped or moved downwardly, out of the way, when the lower shoe will ride upon the top of the drum of the fan casing; and as the upper shoe is vibrated in one direction, upon the end of the lower shoe, this end of the lower shoe will be depressed, the upper shoe also being depressed, through its weight, at this end, and as the shoes are vibrated in the opposite direction they will fall at their opposite ends.

In crating, the lower shoe is adjusted to horizontal position, the top shoe, after turning up the pivoted spout 30, being lifted from its operating rod, removed or pulled forwardly and inserted again, upside down, beneath the casing drum; the hopper is slid from its guideways, turned upside down and inserted in its guideways in the framing, above the lower shoe, and the discharge spouts for the outlet passages of the fan casing dropped downwardly upon their pivots. The hopper valve is opened before the hopper is so placed, and after it is slid to position as stated the hopper valve is closed and the operating rod clamped rigidly in closed position, the bent end of said rod abutting against cross-bar 2' of the framing, preventing movement of the hopper in one direction, and the side boards of the hopper, abutting against said cross-bar, preventing movement of the hopper in the opposite direction, the hopper being thereby locked in position.

The screens of the lower shoes are detachable, and the extra sets of screens of this shoe are inserted within the framing of the machine, in the base receptacle thereof, the lower shoe (upside down) resting upon the sides of the base receptacle, above said extra screens. The screens of the upper shoe are also detachable, and in crating are placed below the upside down hopper. In this way all parts of the machine are crated compactly within the sides of the framing and are well protected, being also secure against working loose.

The double fan casing enables two different kinds of seed or grain to be properly cleaned at the same time, the valves in the inlet passages to the fan casing sections being respectively regulated to accord with the requirements in cleaning the different kinds of seed or grain.

And inasmuch as the air sucked into the downwardly inclined inlet passages to the fan casing strikes the seed or grain passing downwardly from the screens of the lower shoe, and acts upon the same throughout its course through the casing and through the outlet passages, damp grain of low grade will have the moisture contents reduced materially, thereby enhancing the value of the grain. The grain will be retarded in its movement by the downward inclination of the outlet passage, thereby facilitating the reduction of the moisture contents, inasmuch as the discharge blast from the fan will have a longer time to act thereupon.

The long screens are preferably double wired and fastened at top and bottom, at the top end with a securing strip 57 laid in a groove 58 of the screen frame. The securing strips, being laid upon wire and nailed down, serve to stretch the wire of the screen and avoid bagging thereof or pulling loose at the top end.

I claim:—

1. In a grain and seed cleaner, a fan casing having at one end an entrance passage and at the other end a discharge passage, a vibratory screen delivering into said entrance passage, an air deflector board in said entrance passage, and a fan in said casing arranged to discharge a chaff-lifting blast of air against said deflector board and a grain-discharging blast of air through said discharge passage.

2. In a grain and seed cleaner, a fan casing having at one end a downwardly inclined entrance passage and at the other end an upwardly inclined discharge passage, a vibratory screen delivering into said entrance passage, an air deflector board in said entrance passage, a fan rotating in substantial contact with said casing and discharging a chaff-lifting blast of air against said deflector board and a grain-discharging blast of air through said outlet passage.

3. In a grain and seed cleaner, a vibratory inclined screen, a fan, a fan casing having at one end an entrance passage inclined downwardly thereto and at the opposite end an outlet passage, said screen discharging into said entrance passage and the latter discharging into the fan casing, said fan acting to convey the grain from the fan casing through said outlet passage, and an air deflector board located in the throat of and having an inclination similar to that of said entrance passage to provide a chaff-lifting blast of air from said fan.

4. In a grain and seed cleaner, a vibratory inclined screen, a fan casing having at one end an entrance passage inclined downwardly thereto and at the opposite end an outlet passage inclined upwardly therefrom and adapted to retard the movement of the grain and seed, said screen discharging into said entrance passage and the discharged grain being under the influence of the air suction and blast throughout its course through the entrance passage, fan casing and outlet passage.

5. In a grain and seed cleaner, a vibratory inclined screen, a fan, a fan casing having at one end an entrance passage inclined downwardly thereto and at the opposite end an outlet passage inclined upwardly therefrom and adapted to retard the movement of the grain and seed, said screen discharging into said entrance passage and the latter discharging into the fan casing, said fan acting to convey the grain from the fan casing upwardly through said outlet passage.

6. In a grain and seed cleaner, a vibratory screen, a fan casing having at one end an entrance passage and at the other end an outlet passage, said screen discharging into said entrance passage, a downturned spout for the outlet passage, said spout adjustable out of the way to allow the material to be thrown clear of the machine.

7. In a grain and seed cleaner, a vibratory inclined screen, a fan, a fan casing having at one end an entrance passage and at the opposite end an outlet passage, said screen discharging into said entrance passage and the latter discharging into said casing, said fan acting to convey the grain bodily from the casing through said outlet passage, and a downturned spout for the outlet passage, said spout adjustable out of the way to allow the grain to be thrown clear of the machine.

8. In a grain and seed cleaner, axially alined fans, a casing for each fan having at one end an entrance passage and at the other end a discharge passage, upper and lower vibratory screens delivering respectively into different entrance passages, a central discharge chute for impurities, and a lower receptacle to receive the impurities.

9. In a grain and seed cleaner, axially alined fans, a casing for each fan having at one end an entrance passage and at the other end a discharge passage, a vibratory shoe having upper and lower screens and inclined strips at the lower ends of the screens to direct the deliveries thereof to opposite sides, respectively into different entrance passages, and a central discharge chute for impurities passing through both screens.

10. In a grain and seed cleaner, upper and lower vibratory screens, fan casings arranged side by side, a fan in each casing, each casing having at one end an entrance passage and at the opposite end an outlet passage, said screens discharging respectively into different entrance passages and the latter discharging into said casings, each fan acting to convey the grain bodily from its casing through the related outlet passage, an independently adjustable air deflector board in each entrance passage, and a central discharge chute for impurities passing through both the upper and the lower screens.

11. In a grain and seed cleaner, a horizontal slideway at the upper portion thereof, a vibratory screen, and a hopper adjustable in said slideway to discharge over varying portions of said screen, said hopper adapted to engage said slideway upside down in crating.

12. In a grain and seed cleaner, a horizontal slideway, a vibratory screen, and a hopper adjustable in said slideway to discharge over varying portions of said screen, said hopper adapted to engage said slideway upside down in crating, and means for locking the hopper in upside down crating position.

13. In a grain and seed cleaner, a horizontal slideway, a vibratory screen, a hopper adjustable in said slideway to discharge over varying portions of said screen, a valve board for said hopper, an operating rod for said valve board having at its lower end rigid connection with the central portion of said board, the frame of the hopper having a transverse clamp engaging adjustably the outer end of said rod, said hopper adapted to engage said slideway upside down in crating, the frame of the hopper having a transverse brace bar, the hopper when crated having engagement with said bar to limit movement thereof in one direction, said rod having an outturned end engaging said bar to limit movement of the hopper in the opposite direction.

14. In a grain and seed cleaner, a lower vibratory screen-carrying shoe having at one end a stationary slide bearing, at its other end free to move upwardly and downwardly, and intermediately of its length a stationary rocking bearing, an upper vibratory screen-carrying shoe having at one end a stationary slide bearing and at its other end a slide bearing upon the free end of the lower shoe.

15. In a grain and seed cleaner, an upper vibratory screen-carrying shoe, a lower vibratory screen carrying shoe having at one end a stationary bearing and at its other end a vertically adjustable bearing to vary the inclination, a fan casing below the lower shoe, said adjustable bearing movable out of the way to cause the lower shoe to have a rocking bearing intermediately of its length upon the fan casing, said upper shoe having at one end a stationary bearing, and at its other end a bearing upon one end of the lower shoe to accomplish the rocking upward and downward movement thereof in its lengthwise vibration.

16. In a grain and seed cleaner, upper and lower screen-carrying shoes, a hopper, a fan casing, said upper shoe removable and insertible between the sides of the machine below said fan casing, said lower shoe movable to substantially level position, and said hopper removable and insertible between the sides of the casing above the upper shoe in upside down position.

17. In a grain and seed cleaner, an upper slideway, a hopper engaging said slideway, upper and lower vibratory screen-carrying shoes, a fan casing below the lower shoe, the latter movable upwardly at one end to substantially level position, the hopper removable and insertible upside down within the sides of the framing above the lower shoe and in engagement with the slideway, the upper shoe removable and insertible below the fan casing within said sides.

18. In a grain and seed cleaner, a hopper, upper and lower vibratory screen-carrying shoes, a fan casing having at one end an entrance passage and at the other end an outlet passage, the screen of the lower shoe discharging into said entrance passage, a hinged spout for the outlet passage and movable within the sides of the framing, a base receptacle for impurities, said lower shoe adjustable to substantially level position, said upper shoe removable and insertible within the sides of the framing below the fan casing, said hopper removable and insertible upside down above the lower shoe, the screens of the upper shoe detachable and insertible above the lower shoe between the same and the hopper, the screens of the lower shoe detachable and extra screens therefor insertible in said base receptacle below the upper shoe.

19. In a grain cleaner and separator, upper and lower vibratory shoes both inclined in the same direction, the lower screen of the upper shoe open below for a substantial portion of its length to discharge the material passing therethrough gradually upon the upper portion of the upper screen of the lower shoe, and a grain board at the lower end portion of the said upper screen and having an inclination opposite thereto to discharge upon said lower screen intermediately of the length of the latter.

In testimony whereof I affix my signature in presence of two witnesses.

CHARLES N. HATFIELD.

Witnesses:
 FORREST McGILLIARD,
 GRACE M. BRENNAN.